United States Patent
Freter

(10) Patent No.: US 11,491,863 B2
(45) Date of Patent: Nov. 8, 2022

(54) FILTER ELEMENT

(71) Applicant: AdFiS products GmbH, Teterow (DE)

(72) Inventor: Heiko Freter, Einbeck (DE)

(73) Assignee: AdFis Products GmbH, Teterow (DE)

( * ) Notice: Subject to any disclaimer, the term of this patent is extended or adjusted under 35 U.S.C. 154(b) by 242 days.

(21) Appl. No.: 16/752,855

(22) Filed: Jan. 27, 2020

(65) Prior Publication Data

US 2020/0254868 A1 Aug. 13, 2020

(30) Foreign Application Priority Data

Feb. 8, 2019 (DE) .......................... 102019000952.5

(51) Int. Cl.
| | |
|---|---|
| *B01D 53/04* | (2006.01) |
| *F02M 25/08* | (2006.01) |
| *B60K 15/035* | (2006.01) |
| *B60K 15/03* | (2006.01) |

(52) U.S. Cl.
CPC .... *B60K 15/03504* (2013.01); *B01D 53/0407* (2013.01); *B01D 2253/34* (2013.01); *B01D 2257/702* (2013.01); *B01D 2259/4516* (2013.01); *B60K 2015/03236* (2013.01); *B60K 2015/03514* (2013.01)

(58) Field of Classification Search
CPC .... B60K 15/03504; B60K 2015/03236; B60K 2015/03514; F02M 25/0854; B01D 53/04; B01D 53/0407; B01D 2253/102; B01D 2253/104; B01D 2253/106; B01D 2253/108; B01D 2253/1124; B01D 2253/202; B01D 2253/34; B01D 2255/2065; B01D 2255/20707; B01D 2257/702; B01D 2259/4516
USPC ................. 95/146; 96/154; 123/519; 55/520
See application file for complete search history.

(56) References Cited

U.S. PATENT DOCUMENTS

| | | | | |
|---|---|---|---|---|
| 2,038,071 | A | * 4/1936 | Wilhelm | B01D 46/0038 96/118 |
| 3,713,281 | A | * 1/1973 | Asker | B01J 35/04 96/154 |
| 4,699,681 | A | * 10/1987 | Kasmark, Jr. | B01D 46/0001 156/192 |
| 4,877,527 | A | 10/1989 | Brownell | |
| 5,137,696 | A | * 8/1992 | Hitachi | F01N 3/2842 422/180 |
| 5,916,531 | A | * 6/1999 | Pan | B01D 53/0446 422/211 |

(Continued)

FOREIGN PATENT DOCUMENTS

| | | |
|---|---|---|
| CN | 1305390 A | 7/2001 |
| CN | 102223944 A | 10/2011 |

(Continued)

*Primary Examiner* — Frank M Lawrence, Jr.
(74) *Attorney, Agent, or Firm* — Richard M. Goldberg

(57) ABSTRACT

Filter element (1) for filtering a substance, in particular a hydrocarbon, out of a fluid flow, in particular out of a fuel container, with a substrate material (2) on which a sorbing, in particular adsorbing, surface is formed on at least one side, at least in part, wherein the filter element (1) includes multiple mutually-opposite layers of the substrate material (2), wherein the individual layers are arranged so as to be mutually spaced, and wherein the filter element (1) includes at least one spacer (6) that is provided between two layers in each case.

19 Claims, 14 Drawing Sheets

(56) References Cited

U.S. PATENT DOCUMENTS

| | | | |
|---|---|---|---|
| 6,379,437 B1 | 4/2002 | Heinonen et al. | |
| 7,160,361 B2 * | 1/2007 | Meiller | B01D 53/02 55/385.1 |
| 2004/0118287 A1 * | 6/2004 | Jaffe | B01J 20/2803 96/121 |
| 2006/0185651 A1 | 8/2006 | Hagler | |
| 2009/0266756 A1 | 10/2009 | Fischer-Fruehholz et al. | |
| 2013/0263741 A1 * | 10/2013 | Mani | F02M 25/0854 96/112 |
| 2016/0367933 A1 * | 12/2016 | Giessl | B01D 53/0407 |
| 2018/0161729 A1 | 6/2018 | Yaeger et al. | |

FOREIGN PATENT DOCUMENTS

| | | |
|---|---|---|
| CN | 106256405 A | 12/2016 |
| DE | 69809581 T2 | 8/2003 |
| FR | 2824758 A1 * | 11/2002 |

* cited by examiner

FIG 15
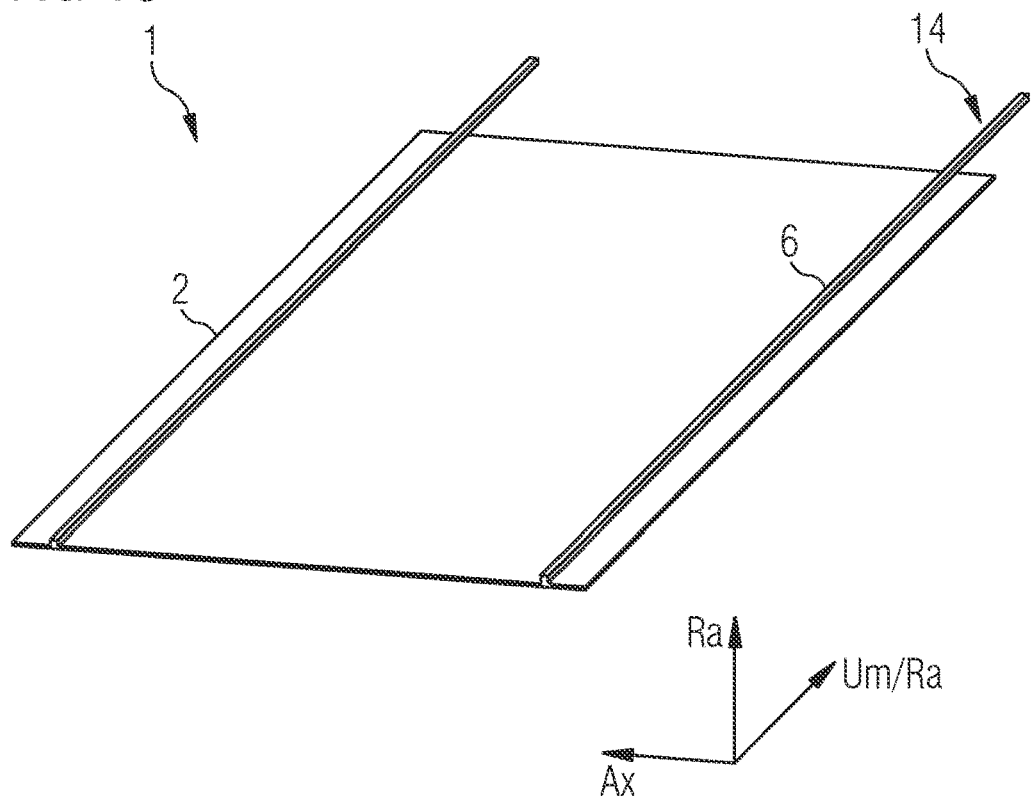
FIG 16
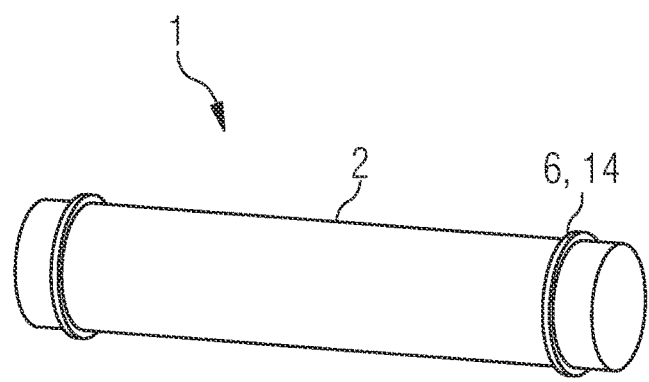
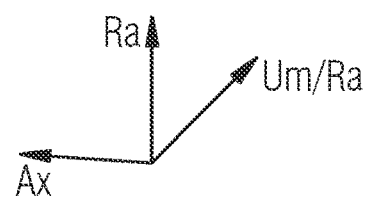

FILTER ELEMENT

BACKGROUND OF THE INVENTION

The invention relates to a filter element for filtering a substance from a fluid flow, a filter housing for the filter element, and a filter system comprising the filter element and the filter housing.

The filter element, filter housing and/or filter system of this kind is used in particular in a filter that opens into the atmosphere, wherein said filter is generally connected downstream of a first filter. In this case, hydrocarbons are generally filtered out of a fluid flow that escapes from a fuel container, for example via the venting path thereof. In this case, it is important to keep the flow resistance in the venting path low, since otherwise for example automatic deactivation of a fuel nozzle during the refueling process is triggered, and the refueling process is aborted. In this case, it should furthermore be observed, that the fluid to be filtered flows through the filter in such a way that as much as possible of the substance to be filtered out is sorbed by the filter. A filter capacity of the filter element and/or of the filter system comprising the filter element is thus intended to be as high as possible, for example as much hydrocarbon as possible is intended to be filtered out of vaporizing gaseous fuel.

SUMMARY OF THE INVENTION

Against this background, an object of the present invention is that of providing an improved filter element, an improved filter housing therefor, and an improved filter system comprising the filter element and the filter housing, in particular having an increased filter capacity.

The object is achieved by the subject matter of the respective independent claim.

One aspect relates to a filter element for filtering a substance, in particular a hydrocarbon, out of a fluid flow, in particular out of a fuel container, with a substrate material on which a sorbing, in particular adsorbing, surface is formed on at least one side, at least in part, wherein the filter element comprises multiple mutually-opposite layers of the substrate material. The individual layers are arranged so as to be mutually spaced, and the filter element comprises at least one spacer which is provided between two layers in each case.

An advantage of the present invention is that the fluid to be filtered flows through defined gaps between the individual layers of the substrate material having a sorbing surface, wherein the gaps are defined by means of the spacer. As a result, depending on the requirements, in particular depending on the substance to be sorbed and/or the sorption means used for the sorbing surface, a gap width can be determined by means of corresponding dimensioning of the spacer. Furthermore, it is thus possible to optimize a flow onto and/or around the sorbing surface. This can further contribute to increasing the filter capacity.

A further advantage of the present invention is that, taking account of the above-mentioned low flow resistance in the venting path in order to ensure a continuous refueling process, the spacer forms regions of increased flow resistance in the gaps between the layers. As a result, turbulence of the fluid to be filtered can be achieved, resulting in as many molecules as possible of the substance to be sorbed coming into contact with the sorbing surface, and thus being sorbed.

The filter element may be an element for filtering out substances and/or particles from a fluid.

The fluid can be a gaseous medium, in particular a fuel vapor or a mixture of air and fuel vapor. Fuel vapor can be a vaporized fuel, in particular gaseous fuel.

The substrate material can be a sheet-like body, on which a sorbing, in particular adsorbing, surface is formed on at least one side, at least in part. Alternatively or in addition to the above-mentioned adsorbing surface, an absorbing surface can be formed on at least one side of the substrate material. Advantageously, the sorbing surface can be formed on both sides of the substrate material and/or over the entire surface thereof.

The sorbing surface can be designed as a coating of the substrate material with sorbing material. Alternatively or in addition thereto, the sorbing material can be incorporated in a structure of the substrate material.

The sorbing material can contain active carbon, activated carbon, clay, zeolite, porous polymer, porous alumina, porous silica, titanium dioxide, cerium dioxide, and/or combinations thereof.

The spacer can be a rigid or flexible element, by means of which two layers of the substrate material can be arranged so as to be mutually spaced. The spacer can protrude approximately perpendicularly from the substrate material, wherein an extension of the spacer, measured perpendicularly from the substrate material, can correspond to a width of the gap, formed in the radial direction of the filter element, between the layers of the substrate material.

An axial direction can be a direction in an extension of a length of a component. In the case of a cylindrically-formed filter element, for example, the axial direction is oriented so as to be approximately in parallel with a surface line or the longitudinal axis of the filter element.

A radial direction is oriented so as to be perpendicular to the axial direction. In the case of a cylindrically-formed filter element, for example, the radial direction is oriented so as to coincide with the radius of the cylindrically-formed filter element. In the case of a hollow-cylindrically-formed body, such as a filter housing, the radial direction extends in the direction of the wall thickness of the hollow-cylindrically-formed filter housing.

Accordingly, a peripheral direction is a direction in an extension of the periphery of the component. A further description of the peripheral direction with respect to the filter element can be found in the following.

Within the meaning of the present invention, the terms "outer" or "inner", and the like, mean that an in particular idealized or imaginary, center point is an innermost point. An outer region with respect thereto is an in particular idealized or imaginary peripheral region. Therefore, proceeding from the center point, in the radial direction, a point or region that is referred to as being located further to the outside than another point or region is further away, in the direction of the peripheral region, than the other point or region.

The multiple layers can be formed of a one-piece substrate material. In other words, the multiple layers of the substrate material can be formed integrally with one another. As a result, handling of the filter element, for example when inserting it into a filter housing, can be simplified compared with a filter element in which the layers are formed of a multi-part substrate material.

The substrate material can be wound approximately helically, such that the filter element is approximately cylindrical and has a cross section, in the radial direction thereof, having an approximately Archimedean spiral shape, approximately Fermat's spiral shape, approximately logarithmic or approximately hyperbolic spiral shape. Alternatively thereto, the substrate material can be wound helically, such that the filter element has a cross section, in the radial direction thereof, that is approximately oval, rectangular or square in shape.

Alternatively thereto, the substrate material can be wound or folded so as to have a cross section, in the radial direction thereof, that is an approximately regular rectangular, chaotic or irregular rectangular line shape.

Advantageously, the fluid to be filtered can flow through uniform narrow gaps between the layers, which can be achieved in particular by means of winding or folding the substrate material. The preferred width of the gap in this case can have a value of approximately 1.0 mm. Furthermore, the width of the gap can be in the range of from approximately 0.4 mm to approximately 6.0 mm, in particular in the range of from approximately 0.8 mm to approximately 1.5 mm. As a result, the likelihood of the molecules to be filtered out of the fluid coming into contact with the sorbing surface, and thus being sorbed—and therefore the filter capacity—can be further increased.

In particular in the case of a larger width of the gap, it could be the case that the substance to be filtered out, in particular a gas molecule to be adsorbed, comes into contact with the sorbing surface only in part, and can thus pass through the filter element unimpeded, i.e. is not sorbed by the filter element. This must be prevented, however.

In order to ensure, in particular in the center of the filter element, in particular in the center of the helically wound substrate material, that the gap between the layers of the substrate material is the same size there as in the remainder of the filter element, a central rod can be provided in the center of the filter element.

Advantageously, the central rod can be designed such that nothing can flow therethrough. Furthermore, the central rod can be dimensioned such that it fills the center of the filter element, in particular the center of the helically wound substrate material, such that the gap formed there between the layers of the substrate material is the same size as in the remainder of the filter element.

In particular, an inner end portion of the helically wound substrate material can be connected to the central rod, in particular at a longitudinal axis of the central rod. For example, the central rod can be designed having a groove that extends along the longitudinal axis thereof, in which groove the inner end portion of the helically wound substrate material is received. Connection of the inner end portion of the helically wound substrate material in the groove of the central rod can be effected by means of clamping and/or adhesive bonding.

For example, the clamping can be performed such that the central rod, comprising the inner end portion of the helically wound substrate material received in the groove thereof, is plastically deformed such that the groove is pressed together, i.e. a groove width is reduced. In this case, the central rod can comprise a plastically deformable material at least in the region of the groove, for example a metal or a plastics material, in particular aluminum.

The spacer can be formed separately from the substrate material and arranged on the substrate material. In particular, the spacer can be fastened, for example adhesively bonded, to the substrate material. The spacer can comprise a material through which the fluid to be filtered can flow, for example an open-pore foam material.

Furthermore, the spacer can, in particular on the relevant layer, be arranged in the peripheral direction of the approximately cylindrically-formed filter element. In particular, a plurality of spacers that are oriented in the peripheral direction can be arranged so as to be mutually spaced in the fluid flow direction, in particular in the axial direction of the approximately cylindrical filter element. Alternatively thereto, a spacer that is oriented so as to be oblique to the axial direction can be provided, which spacer is designed approximately as a helix when the filter element is wound. In this case, the frequency with which the fluid flow is interrupted by a spacer portion depends on how obliquely the spacer is formed with respect to the axial direction, i.e. what the pitch of the helix is.

The peripheral direction of the approximately cylindrically formed, in particular wound, filter element can be oriented so as to be approximately perpendicular to the axial direction thereof, in particular the longitudinal axis thereof. The peripheral direction can also be understood as a winding direction in which the unwound filter element is wound in order to form the approximately cylindrically formed, wound filter element. The spacer that is arranged in the peripheral direction of the approximately cylindrically-formed filter element can be arranged so as to be approximately perpendicular to the axial direction of the approximately cylindrically-formed filter element. For example, the unwound filter element is designed so as to be approximately rectangular, having a shorter and a longer side, wherein the shorter side is approximately in parallel with the axial direction of the wound filter element. In the unwound filter element, the spacer is oriented so as to be approximately perpendicular to the shorter side thereof.

In particular, the spacer, over the length thereof, can be formed continuously or discontinuously on the substrate material. For example, in the case of the unwound filter element the spacer can extend in an uninterrupted manner over the longer side thereof, on the substrate material.

Alternatively thereto, for example in the case of the unwound filter element the spacer can extend in an interrupted manner over the longer side thereof, on the substrate material. In other words, multiple spacers that are oriented perpendicularly to the axial direction of the approximately cylindrically-formed filter element and that are mutually spaced perpendicularly to the axial direction can be arranged one behind the other on the substrate material, in particular in the direction of the longer side of the unwound filter element. Alternatively or in addition thereto, multiple spacers that are mutually spaced in the axial direction of the approximately cylindrically-formed filter element can be arranged on the substrate material, which spacers are oriented perpendicularly to the axial direction. For example, two spacers that are approximately mutually parallel can be arranged on the substrate material so as to be oriented in the peripheral direction of the approximately cylindrically-formed filter element.

The spacer can be wound with the substrate material. In particular, the spacer can be wound inside the substrate material or can be wound up on the outside of the substrate material.

The above configuration allows for a fluid flowing through the filter element to be swirled. As a result, molecules of the substance to be sorbed are more likely to be able to come into contact with the sorbing surface, and thus be sorbed.

The spacer can be dimensioned such that an end portion of the spacer protrudes from the wound filter element in the peripheral direction. In other words, the spacer can be dimensioned such that the length thereof is greater than a length of the unwound substrate material, in the winding direction thereof. The end portion of the spacer that protrudes from the wound filter element can be arranged on the outside of the filter element, in the peripheral direction. In other words, the end portion of the spacer that protrudes from the wound filter element can be arranged so as to surround the filter element, on the outermost layer of the substrate material thereof.

The spacer can be formed integrally with the substrate material. In other words, the spacer can be formed from the substrate material.

In particular, the spacer can be formed as an embossment of the substrate material.

For example, the embossment can be formed as an in particular approximately punctiform or approximately hemispherical elevation. A height of the elevation measured perpendicularly to the substrate material can be dimensioned between the layers, depending on the desired gap.

Alternatively or in addition thereto, the embossment can comprise a rod-like elevation, the cross section of which is approximately rectangular, approximately triangular or approximately semi-circular, and wherein the embossment is oriented approximately in the axial direction of the approximately cylindrically-formed filter element. In other words, the embossment can be oriented so as to be approximately perpendicular to the winding direction of the unwound substrate material.

Alternatively thereto, the embossment can be oriented approximately in the peripheral direction of the approximately cylindrically-formed filter element, or obliquely to the axial direction of the filter element.

In particular, multiple spacers can be arranged on the substrate material such that one group of spacers is oriented in the radial direction of the approximately cylindrically-formed filter element. Alternatively or in addition thereto, multiple such groups of spacers can be configured to be uniformly distributed over a radial cross section of the filter element. In this case, the spacers can be formed separately from the substrate material and attached thereto, or formed integrally with the substrate material.

In particular, one or more of the groups of spacers can be provided in addition to the above-described spacers.

The above configuration likewise allows for a fluid flowing through the filter element to be swirled. As a result, molecules of the substance to be sorbed are more likely to be able to come into contact with the sorbing surface, and thus be sorbed.

A further aspect relates to a filter housing for receiving the filter element according to one of the aspects described above, wherein the filter element can be received in the filter housing in the axial direction.

The advantages of the filter element mentioned in relation to the above-described aspects also apply analogously to the filter housing.

The filter housing can be formed so as to be approximately hollow-cylindrical, having an annular cross section. Alternatively thereto, the filter housing can have a cross section, in the radial direction thereof, that is approximately oval, polygonal, rectangular or square in shape.

It can be possible for the filter element to be positionable in the radial direction, by means of a positioning means formed on an inner wall of the filter housing.

The positioning means can be formed as the end portion of the spacer that is arranged circumferentially on the filter element in the peripheral direction, and/or as projections formed on the inner wall of the filter housing.

A length of the end portion of the spacer that is arranged circumferentially on the filter element in the peripheral direction can correspond at least to a length of an inner periphery of a receiving portion for the filter element in the filter housing. As a result, the end portion of the spacer that is arranged circumferentially on the filter element in the peripheral direction can bring about sealing of the filter element with respect to the filter housing.

The projections can be designed so as to protrude inwards, from the inner wall, in the radial direction. An extension of the projections in the radial direction can be approximately half the size of a gap between the layers of the substrate material, formed regularly over a radial cross section of the filter element.

In particular, the projections can be formed integrally with the filter housing, in particular with the receiving portion. Alternatively thereto, the projections can also be configured as separately-formed components or continuously as a separate component.

Advantageously, the spacer or at least one group of spacers can be formed on the filter housing.

Expediently, multiple spacers can be arranged on the filter housing such that one group of spacers is oriented in the radial direction of the approximately cylindrically-formed filter housing.

Alternatively or in addition thereto, a plurality of such groups of spacers can configured uniformly-distributed over a radial cross section of the filter housing.

A further advantage of the filter housing according to the invention is that the substrate material can be wound up in the filter housing, using the spacers formed thereon or the least one group of spacers, in order to bring about the desired gap between the layers of the substrate material.

In particular, axial ribs for achieving a uniform incident flow against the filter element can be formed on at least one end portion of the filter housing. As a result, the likelihood of molecules of the substance to be sorbed coming into contact with the sorbing surface, and thus being sorbed, can be further increased.

For example, a plurality of the axial ribs can be formed so as to be uniformly distributed over a radial cross section.

The filter housing can be formed having a quick release fastener on at least one free end. As a result, the filter housing can be mounted on a venting path of a fuel container or removed therefrom in a simple manner.

The filter housing can be formed as a separate component or can be part of another component, for example an activated carbon filter means.

If formed as a separate component, the filter housing can for example be fluidically connected to lines of the venting path of the fuel container, in order that fuel emissions from the fuel container are guided through the filter housing, and thus through the filter element, on their way towards the atmosphere.

A further aspect relates to a filter system comprising a filter element and a filter housing according to one of the aspects described above, wherein an intermediate space between the inner wall of the filter housing and the filter element is approximately half the size of a uniform gap, in particular caused by the spacer, between two layers of substrate material.

The advantages of the filter element and/or of the filter housing mentioned in relation to the above-described aspects also apply analogously to the filter system comprising the filter element and filter housing.

Owing to the intermediate space, in particular owing to the above-described dimensioning thereof, an outer sorbing surface of the substrate material of the filter element received in the filter housing can efficiently receive an incident flow of the fluid to be filtered.

BRIEF DESCRIPTION OF THE DRAWINGS

In the following, exemplary embodiments of the filter element according to the invention and of the filter housing according to the invention are explained in greater detail, with reference to drawings. Of course, the present invention is not limited to the exemplary embodiments described below, and individual features thereof can be combined to form further exemplary embodiments.

In the drawings:

FIG. 15 is a three-dimensional view of a filter element according to the invention according to an eleventh exemplary embodiment, wherein an end portion of the spacer to be wound-in protrudes in the peripheral direction from the filter element, shown unwound;

FIG. 16 is a three-dimensional view of a filter element according to the eleventh exemplary embodiment, wherein the end portion of the wound-in spacer is arranged circumferentially around the wound filter element in the peripheral direction;

DETAILED DESCRIPTION

The axial direction Ax, the peripheral direction Um, and the radial direction Ra are shown in the figures by arrows, in particular in the manner of a coordinate system. Although the arrows in each case point merely in one direction, the direction specification also contains an opposite direction in each case. By way of example, in each case two radial directions Ra are specified; this is merely intended to give the impression of the many possible radial directions Ra.

Figure 1:
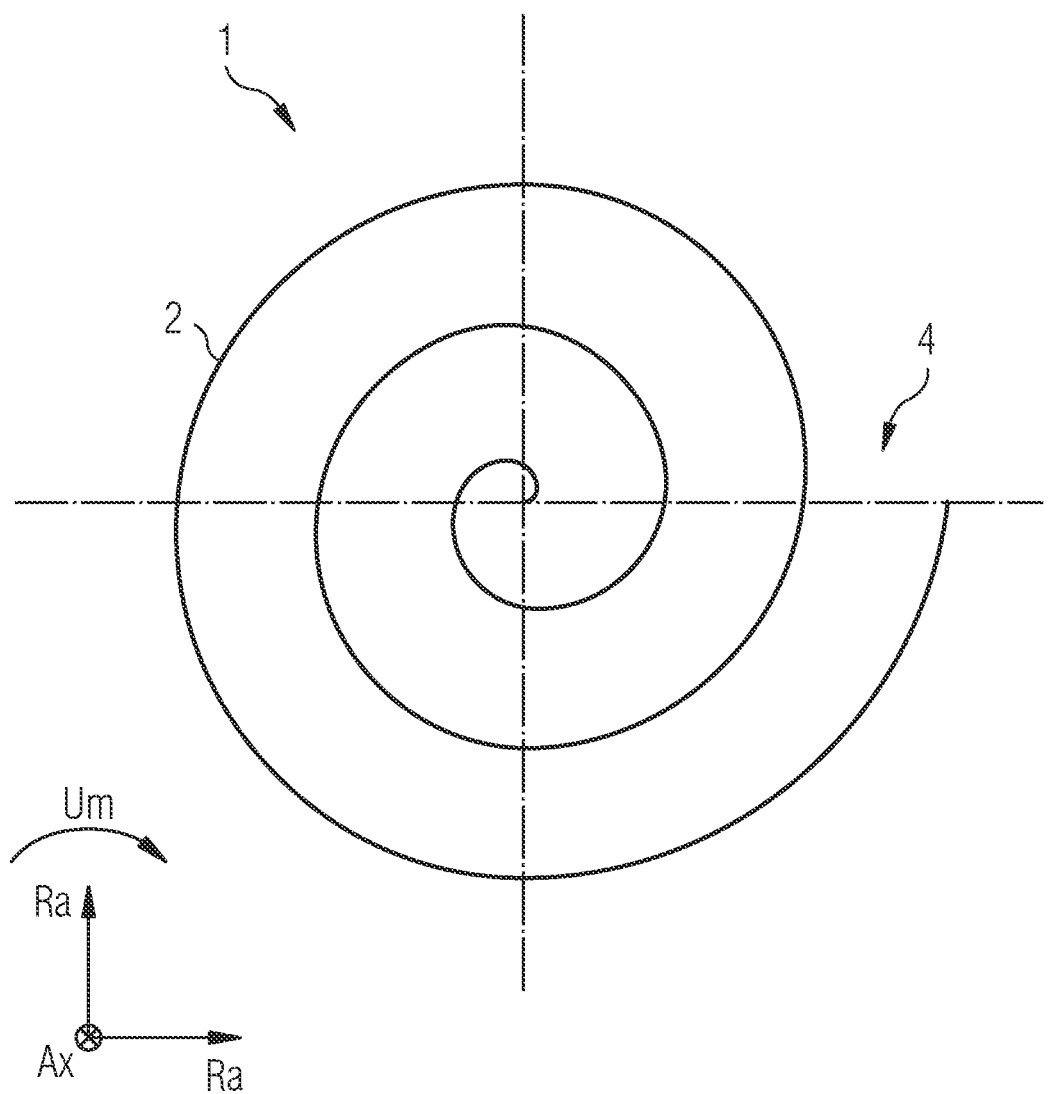
FIG. 1 is a plan view of a filter element according to the invention according to a first exemplary embodiment, the substrate material of which is wound in the shape of an Archimedean spiral.

FIG. 1 shows a filter element 1 according to a first exemplary embodiment, in a plan view seen in the axial direction Ax thereof. A substrate material 2 of the filter element 1 is wound in the shape of an Archimedean spiral. In the first exemplary embodiment shown here, layers of the substrate material 2 are mutually spaced by the same amount in each case. In other words, gaps 4 between the layers of the substrate material 2 are the same size in each case.

Figure 2:
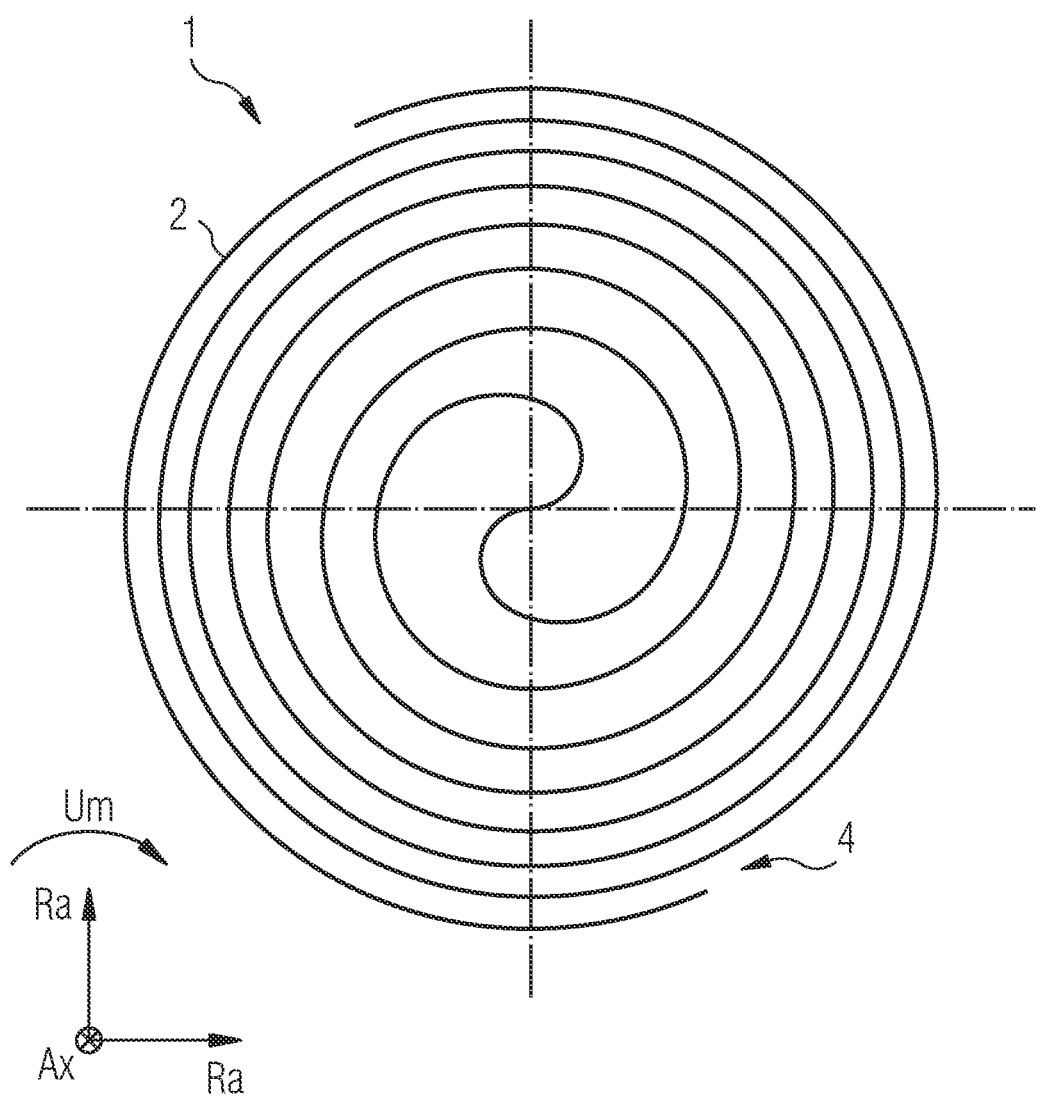
FIG. 2 is a plan view of a filter element according to the invention according to a second exemplary embodiment, the substrate material of which is wound in the shape of a Fermat's spiral.

FIG. 2 shows a filter element 1 according to a second exemplary embodiment, in a plan view seen in the axial direction Ax thereof. A substrate material 2 of the filter element 1 is wound in the shape of a Fermat's spiral, in which the layers of the substrate material 2 are mutually spaced by a different amount in each case. In the second exemplary embodiment shown here, the layers of the substrate material 2 are closer and closer together as the distance from the center of the spiral increases. In other words, a width of the gap 4 between the layers of the substrate material 2 decreases with distance from the center.

Figure 3:
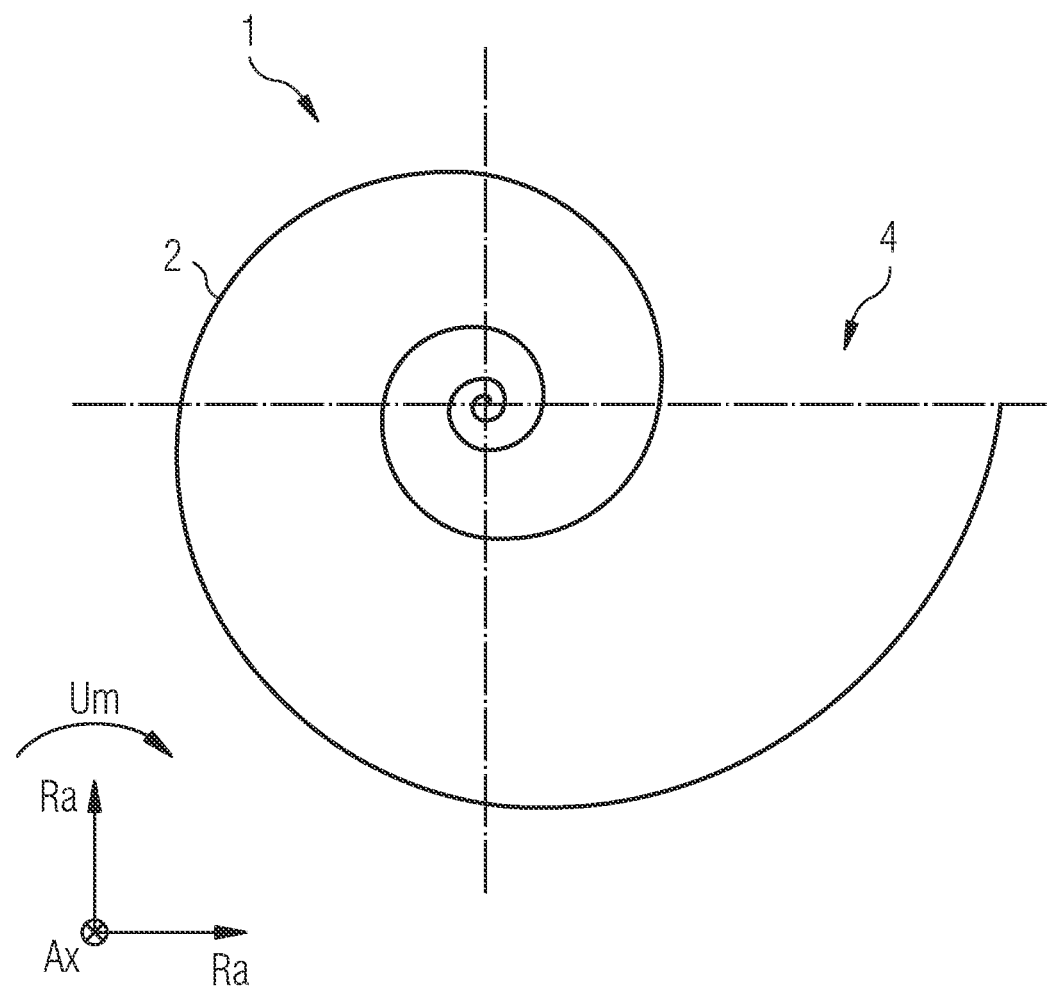
FIG. 3 is a plan view of a filter element according to the invention according to a third exemplary embodiment, the substrate material of which is wound in the shape of a logarithmic spiral.

FIG. 3 shows a filter element 1 according to a third exemplary embodiment, in a plan view seen in the axial direction Ax thereof. A substrate material 2 of the filter element 1 is wound in the shape of a logarithmic spiral, in which a spacing of the respective layer of the substrate material 2 changes by the same factor, with each rotation about the center point of the spiral. In the third exemplary embodiment shown here, the layers are spaced further and further apart as the distance from the center of the spiral increases. In other words, a width of the gap 4 between the layers of the substrate material 2 increases with distance from the center. Alternatively thereto, the substrate material 2 can be wound in the shape of a hyperbolic spiral (not shown), wherein a radius of the spiral increases exponentially with an angle.

Figure 4:
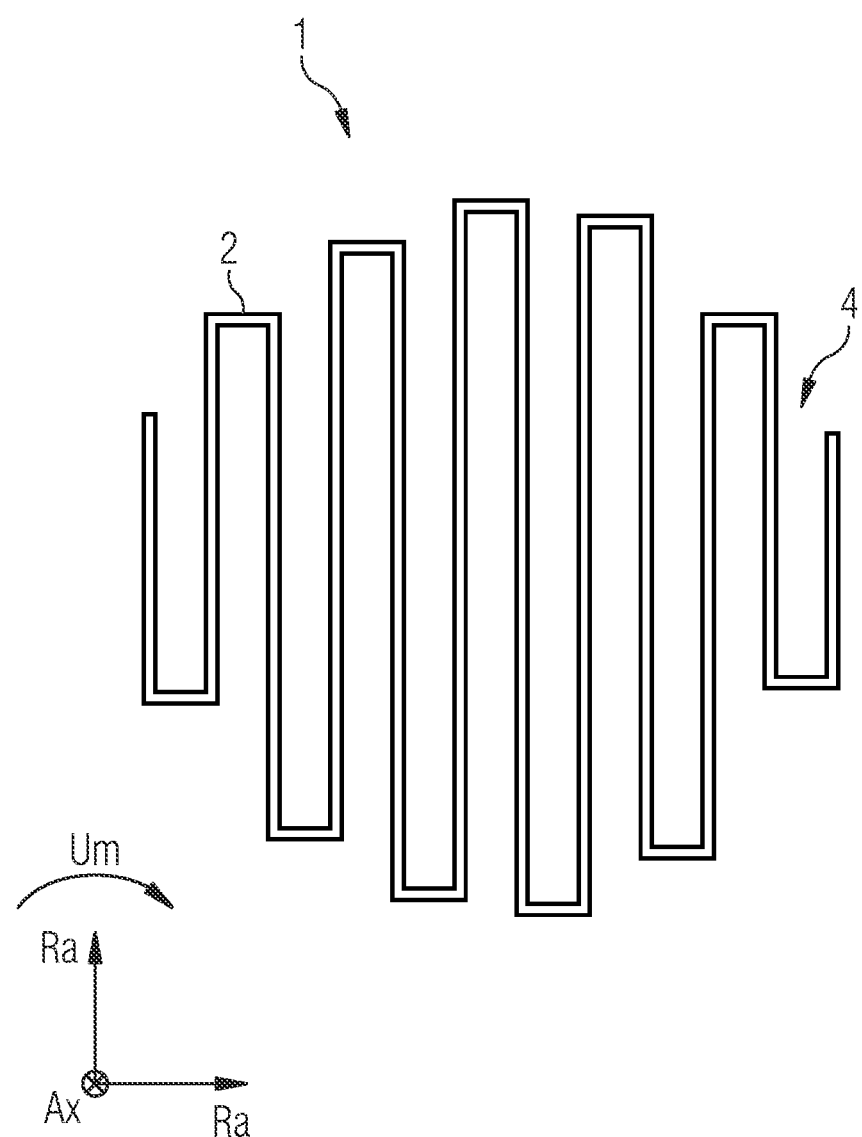
FIG. 4 is a plan view of a filter element according to the invention according to a fourth exemplary embodiment, the substrate material of which is folded uniformly in a rectangular shape.

FIG. 4 shows a filter element 1 according to a fourth exemplary embodiment, in a plan view seen in the axial direction Ax thereof. A substrate material 2 of the filter element 1 is folded in a uniformly rectangular manner. In the fourth exemplary embodiment shown here, layers of the substrate material 2 are mutually spaced by the same amount in each case. In other words, gaps 4 between the layers of the substrate material 2 are the same size in each case, but can also vary, i.e. be of different sizes.

Figure 5:
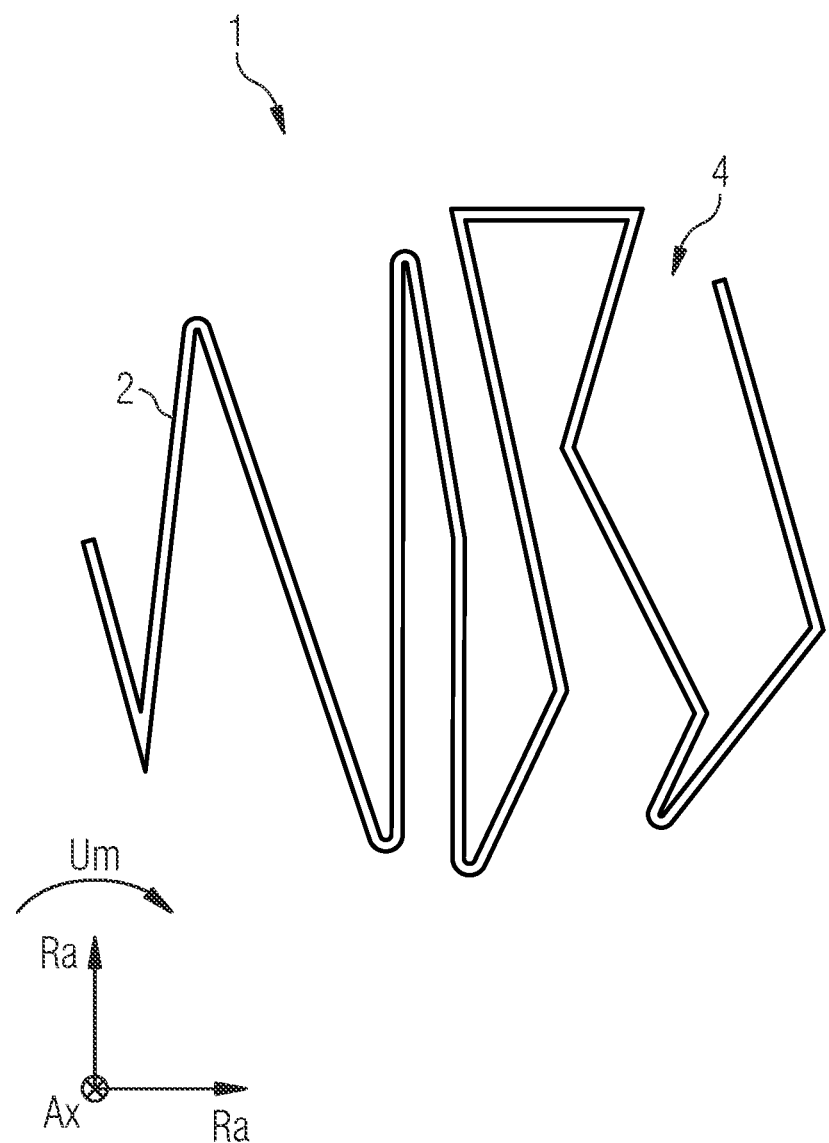
FIG. 5 is a plan view of a filter element according to the invention according to a fifth exemplary embodiment, the substrate material of which is folded in a chaotic manner.

FIG. 5 shows a filter element 1 according to a fifth exemplary embodiment, in a plan view seen in the axial direction Ax thereof. A substrate material 2 of the filter element 1 is folded in a chaotic manner. In the fifth exemplary embodiment shown here, the layers of the substrate material 2 are furthermore mutually spaced apart in an irregular manner. In other words, a size, in particular width, of the gaps 4 between the layers of the substrate material 2 is arbitrary in each case.

Figure 6:
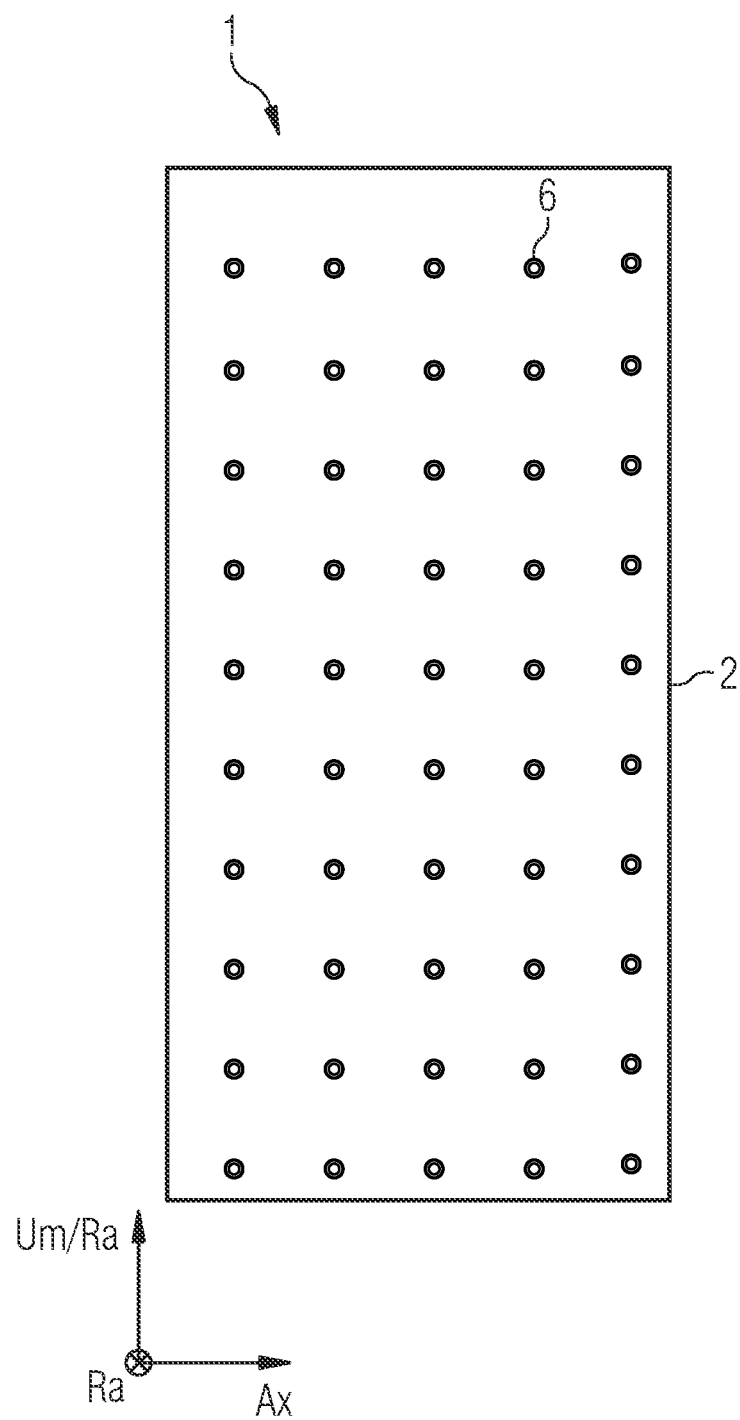
FIG. 6 is a plan view of a filter element according to the invention according to a sixth exemplary embodiment, the substrate material of which is shown unwound, and comprises spacers that are formed integrally therewith.

FIG. 6 is a plan view of a filter element 1 according to the invention according to a sixth exemplary embodiment, the substrate material 2 of which is an approximately rectangular sheet-like body, the short side of which becomes the axial direction Ax of the wound filter element 1.

The sixth exemplary embodiment shown here shows the filter element 1 with the unwound substrate material 2, said filter element comprising spacers 6 that are formed integrally therewith and in this case are configured as an embossment of the substrate material 2.

As furthermore shown in the sixth exemplary embodiment, the spacers 6 are arranged in a regular manner on the substrate material 2. Alternatively or in addition thereto, the spacers 6 can be arranged on the substrate material 2 in an irregular manner at least in part, in order to ensure additional swirling of the fluid to be filtered.

Figure 7:
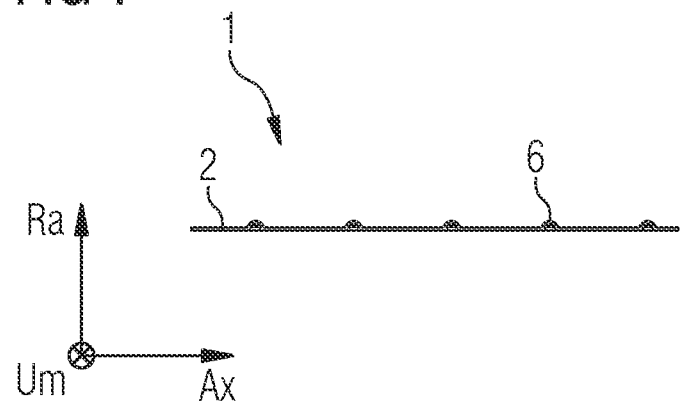
FIG. 7 is a front view of the filter element according to the sixth exemplary embodiment.
Figure 8:
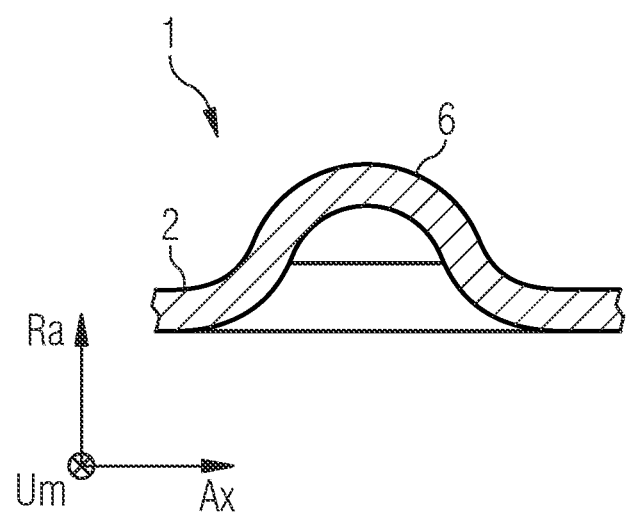
FIG. 8 is an enlarged detail of a sectional front view of the filter element according to the sixth exemplary embodiment.

As shown in FIG. 7 by a front view of the filter element 1 according to the sixth exemplary embodiment, and in FIG. 8 by an enlarged detail of the sectional front view of the filter element 1 according to the sixth exemplary embodiment, a spacer 6 is formed as an approximately hemispherical elevation that protrudes from the substrate material 2. Alternatively or in addition thereto, the spacer 6 can also be formed so as to be rectangular or triangular when viewed in cross section. As shown here, the spacer 6 is formed of the substrate material 2, and alternatively or in addition thereto at least one of the spacers 6 can be formed separately from the substrate material 2 and be arranged on the substrate material 2. For example, the elevation can be produced by embossing or partial punching of the substrate material.

Figure 9:
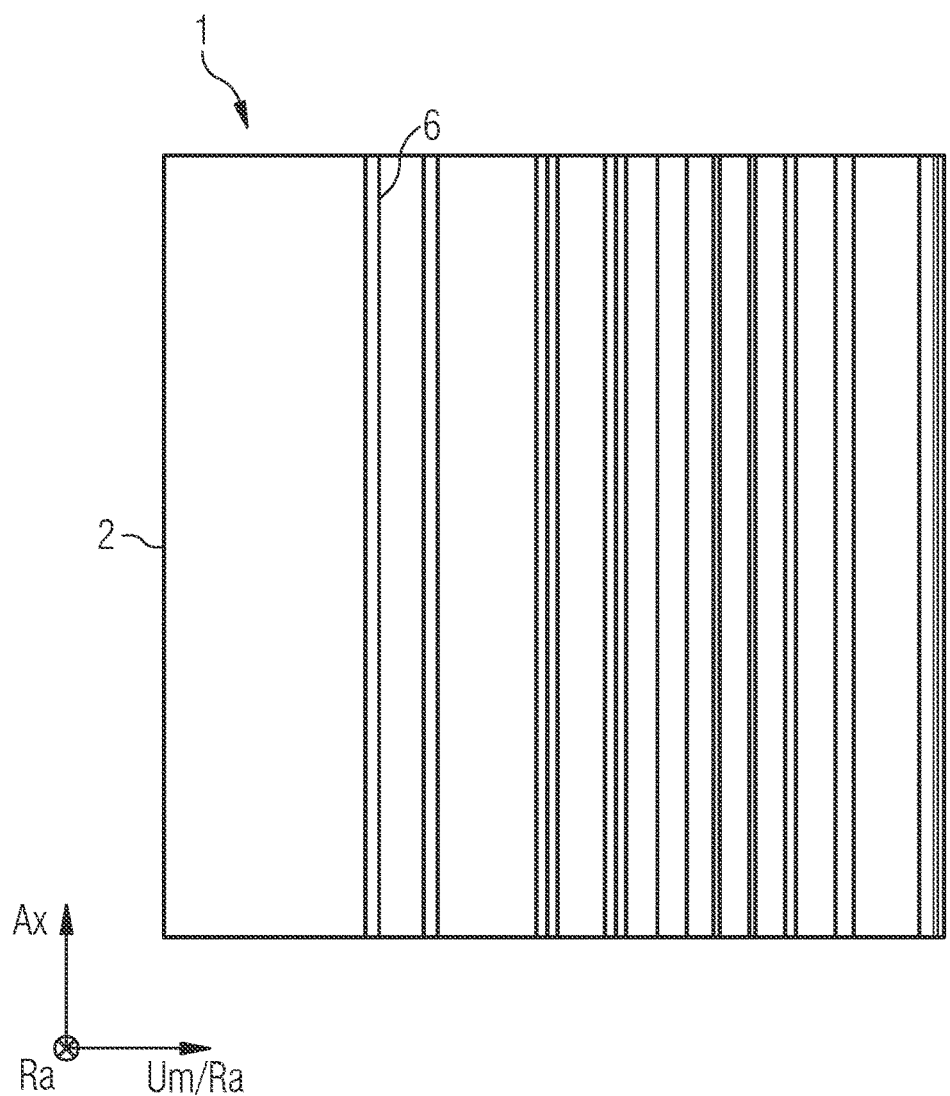
FIG. 9 is a plan view of a filter element according to the invention according to a seventh exemplary embodiment, the substrate material of which is shown unwound, and comprises spacers that are formed integrally therewith.

FIG. 9 is a plan view of a filter element according to the invention according to a seventh exemplary embodiment, the substrate material 2 of which is an approximately square sheet-like body.

On the substrate material 2, spacers 6 are formed integrally therewith, which spacers are oriented in the axial direction Ax of the wound filter element 1. In the seventh exemplary embodiment shown here, the spacers 6 are formed as a rod-like embossment of the substrate material 2.

Figure 10:
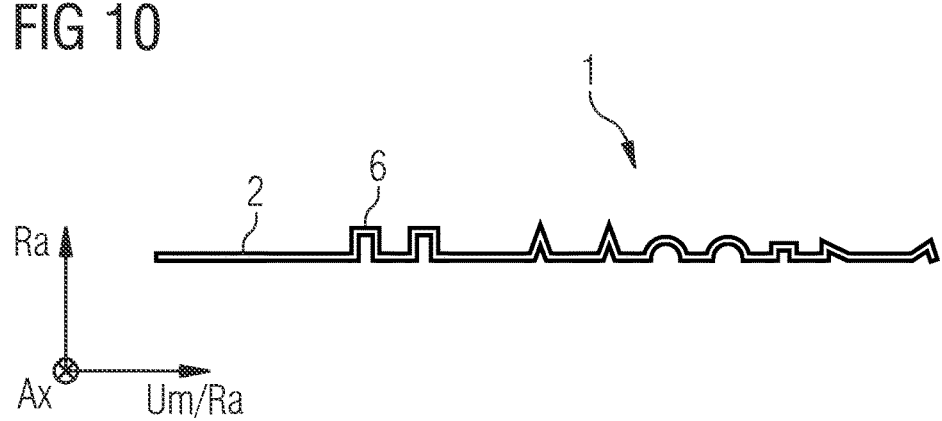
FIG. 10 is a front view of the filter element according to the seventh exemplary embodiment.

As shown in FIG. 10, in the front view of the filter element 1 according to the seventh exemplary embodiment, on the basis of different shapes for the spacers 6, a cross section of the rod-shaped elevation can be approximately rectangular, approximately triangular or approximately hemispherical. As shown here, the spacer 6 is formed of the substrate material 2, and alternatively or in addition thereto at least one of the spacers 6 can be formed separately from the substrate material 2 and be arranged on the substrate material 2. For example, the rod-shaped elevation can be produced by embossing or partial punching of the substrate material.

Figure 11:
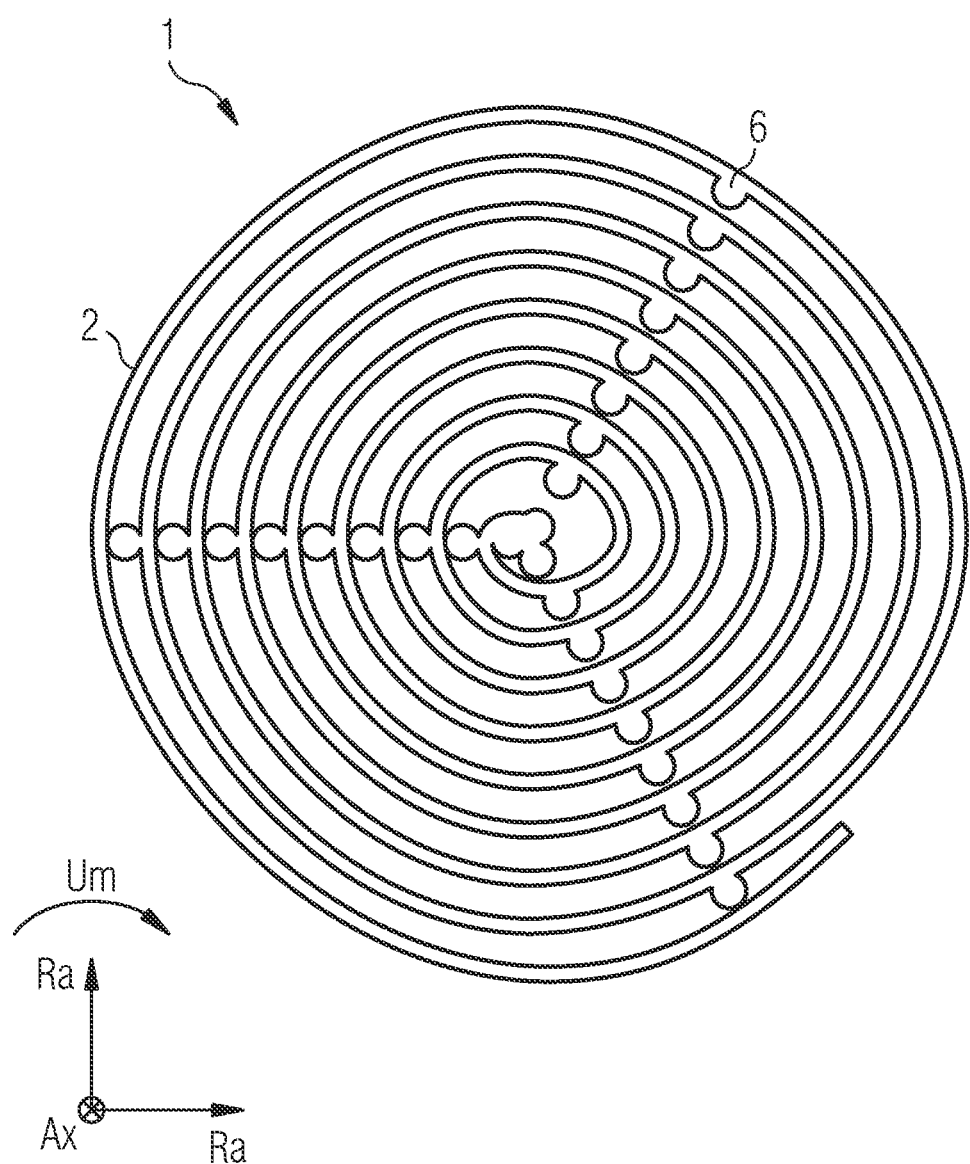
FIG. 11 is a plan view of a filter element according to the invention according to an eighth exemplary embodiment, comprising spacers wound into the filter element.

FIG. 11 is a plan view of a filter element 1 according to the invention according to an eighth exemplary embodiment, in which multiple spacers 6 are wound into the filter element 1.

In the eighth exemplary embodiment shown here, the spacers 6 are arranged on the substrate material 2 such that multiple of groups of spacers 6 are oriented in the radial direction Ra of the approximately cylindrically-formed filter element 1. The groups of spacers 6 are distributed uniformly over a radial cross section of the filter element 1.

Figure 12:
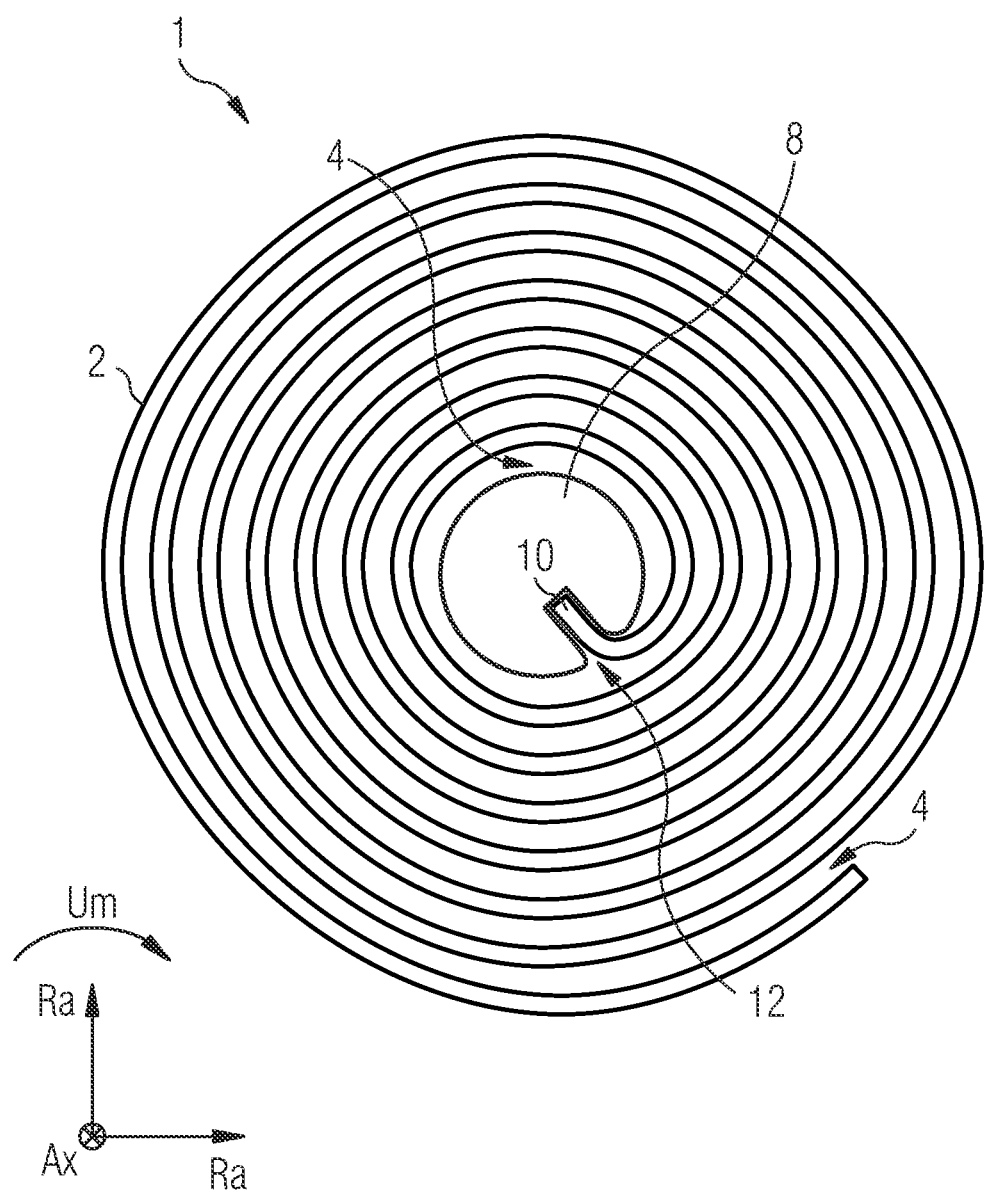
FIG. 12 is a plan view of a filter element according to the invention according to a ninth exemplary embodiment, comprising a central rod.

FIG. 12 is a plan view of a filter element 1 according to the invention according to a ninth exemplary embodiment, in which a central rod 8 is provided in the center of the wound filter element 1. The spacer 6 is not shown here.

The central rod 8 is designed such that nothing can flow therethrough, i.e. a fluid flowing through the filter element 1 cannot penetrate the region of the central rod 8.

The central rod 8 is dimensioned such that it fills the center of the filter element 1, i.e. the center of the helically wound substrate material 2, such that the gap 4 formed there between the layers of the substrate material 2 is the same size as in the remainder of the filter element 1.

An inner end portion 10 of the helically wound substrate material 2 is connected to a longitudinal axis of the central rod 8. A groove 12 that extends along the longitudinal axis thereof is formed on the central rod 8, in which groove the inner end portion 10 of the helically wound substrate material 2 is received. In this case, the inner end portion 10 of the helically wound substrate material 2 is adhesively bonded in the groove 12.

Figure 13:
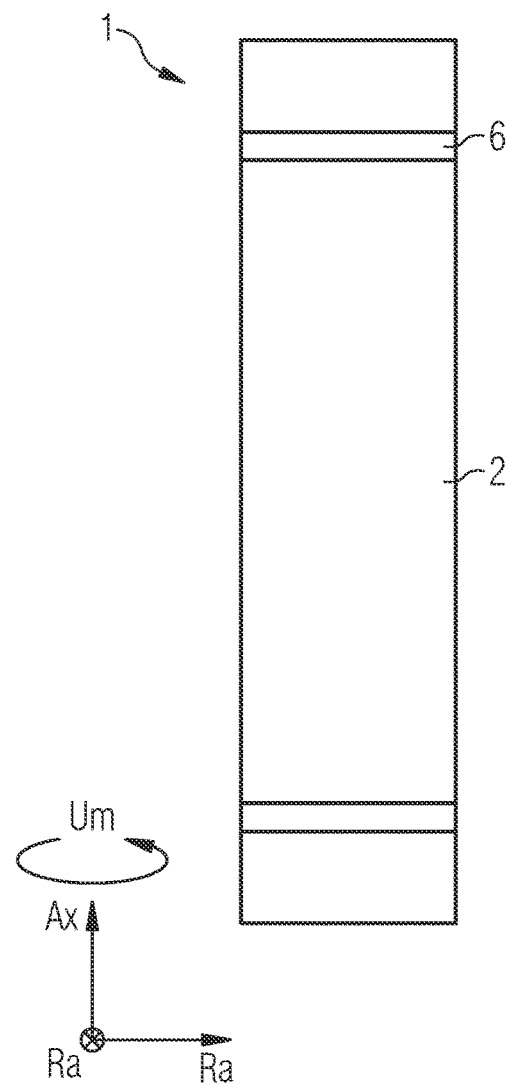
FIG. 13 is a front view of a filter element according to the invention according to a tenth exemplary embodiment, comprising spacers wound into the filter element.

FIG. 13 is a front view of a filter element 1 according to the invention according to a tenth exemplary embodiment, comprising spacers 6 wound into the filter element 1.

The two spacers 6 are oriented approximately mutually parallel and are formed on the substrate material 2 so as to be mutually spaced in the axial direction Ax of the filter element 1.

Figure 14:
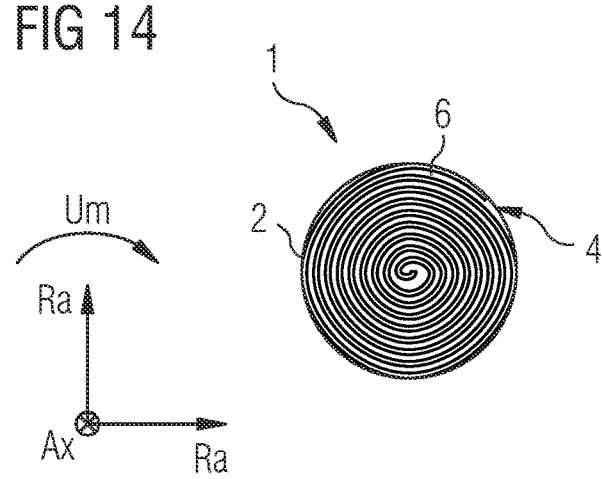
FIG. 14 is a plan view of the filter element according to the tenth exemplary embodiment.

The plan view of the filter element 1 according to the tenth exemplary embodiment, shown in FIG. 14, shows the helically wound substrate material 2 comprising the wound-in spacer 6. The gaps 4 between the layers of the substrate material 2 are the same size, as a result of which an approximately Archimedean spiral is formed.

The three-dimensional view of a filter element 1 according to the invention according to an eleventh exemplary embodiment, shown in FIG. 15, shows an end portion 14 of the spacer to be wound in 6, which end portion protrudes in the peripheral direction Um from the filter element 1, shown unwound.

As in the three-dimensional view of the filter element 1 according to the eleventh exemplary embodiment, shown in FIG. 16, the end portion 14 of the wound-in spacer 6 is arranged circumferentially around the wound filter element 1 in the peripheral direction Um.

Figure 17:
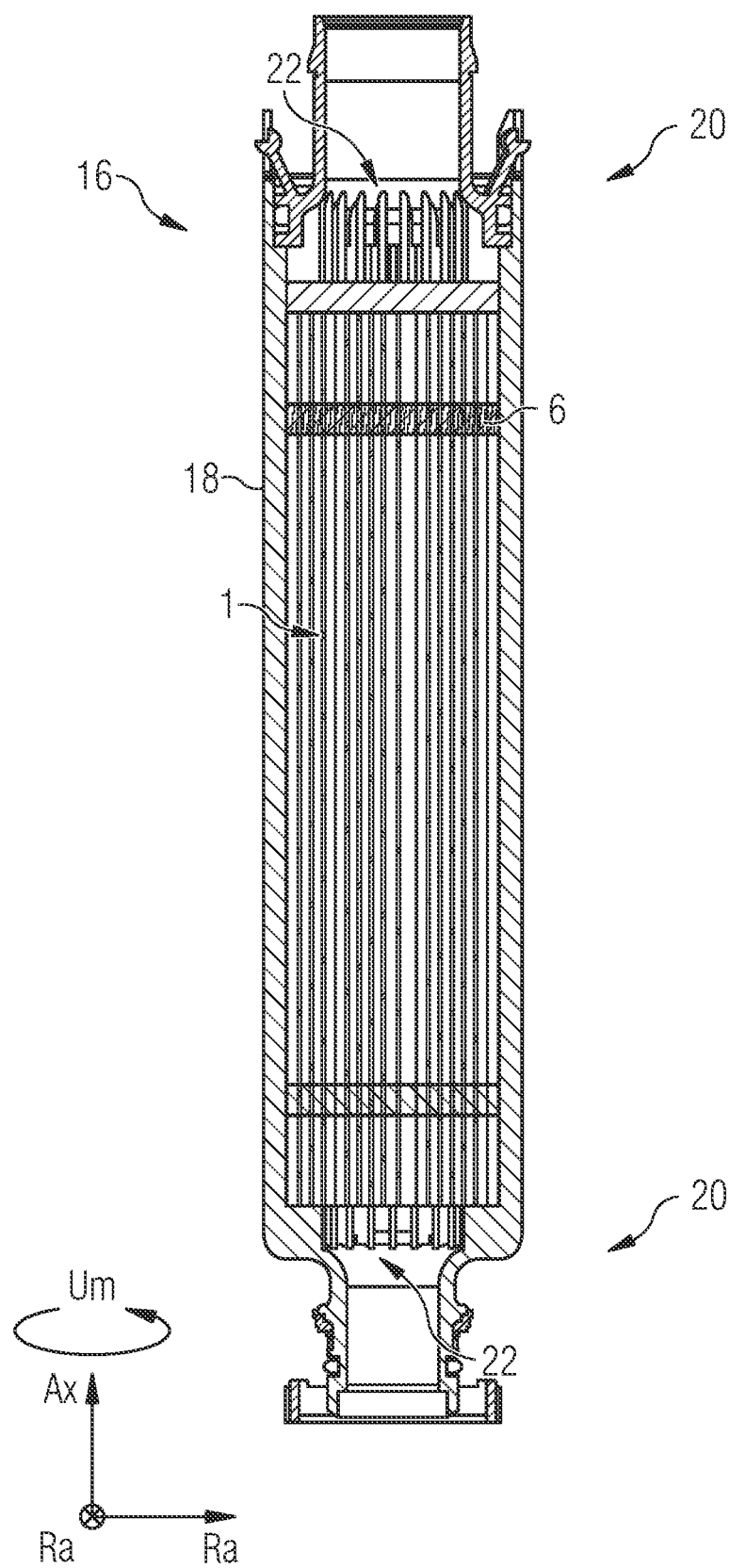
FIG. 17 is a sectional front view of a filter system according to the invention.

In the sectional front view of a filter system according to the invention 16 shown in FIG. 17, the filter element 1 according to the invention is received in a filter housing 18 according to the invention.

The filter element 1 is received in the filter housing 18 so as to be oriented in the axial direction Ax and comprises spacers 6 wound therein, which spacers are mutually parallel and are mutually spaced in the axial direction Ax.

Axial ribs 22 for achieving a uniform incident flow against the filter element 1 are formed on the two end portions 20 of the filter housing 18, wherein a plurality of the axial ribs 22 are uniformly distributed when viewed over a radial cross section of the filter housing 18.

Figure 18:
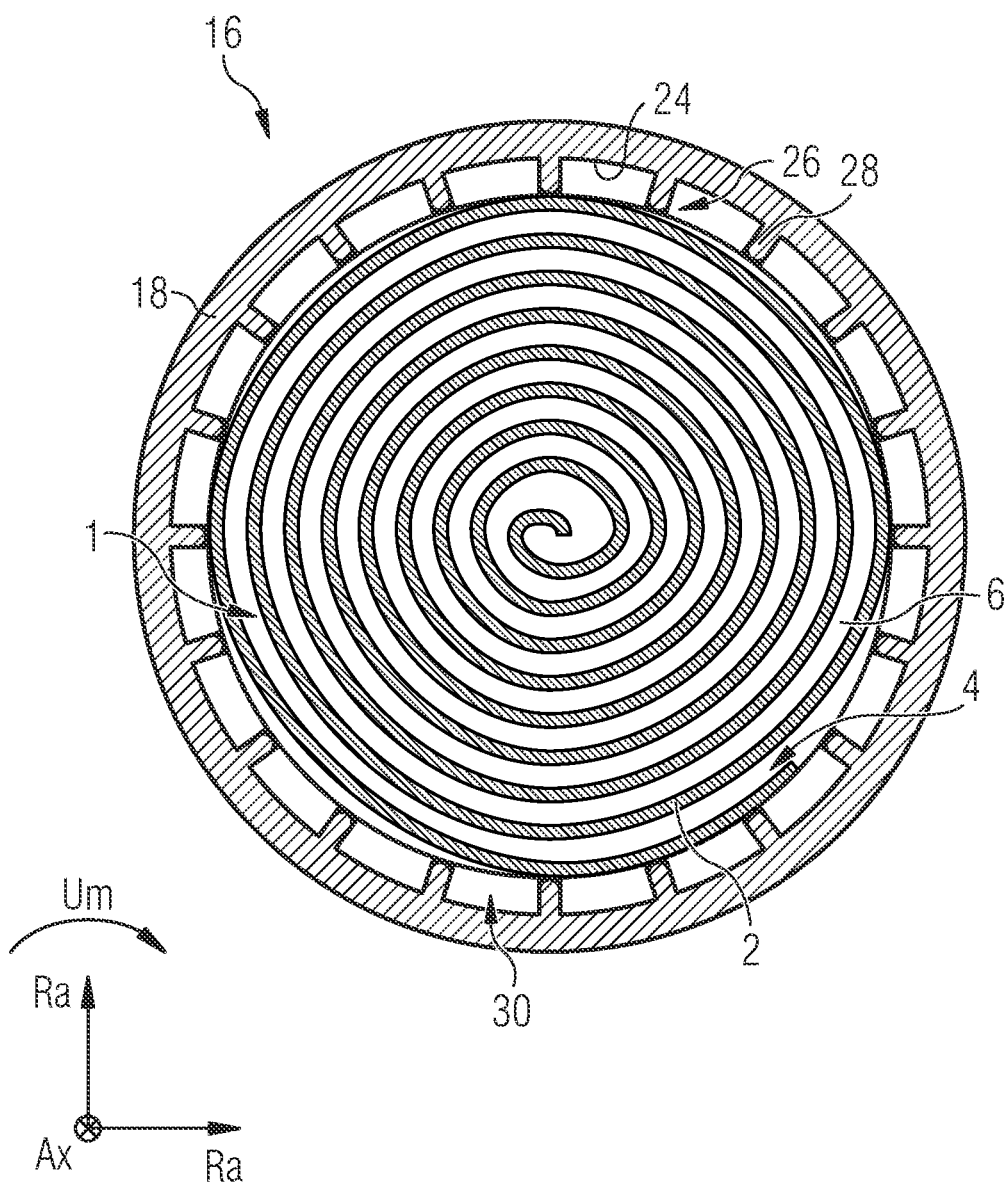
FIG. 18 is a sectional plan view of the filter system according to the invention.

FIG. 18 is a sectional plan view of the filter system 16 according to FIG. 17.

A positioning means 26 for positioning the filter element 1 in the radial direction Ra is formed on an inner wall 24 of the filter housing 18. The positioning means 26 is formed as projections 28 which protrude inwards, in the radial direction Ra, from the inner wall 24.

The extension of the projections 28 in the radial direction Ra is approximately half the size of the gap 4, formed regularly over the radial cross section of the filter element 1, between the layers of the substrate material 2.

Alternatively thereto, the positioning means 26 can be formed as the end portion 14 of the spacer 6 that is arranged circumferentially around the filter element 1 in the peripheral direction Um. In this case, an extension of the end portion 14 of the spacer 6 that is arranged circumferentially around the filter element 1 in the peripheral direction Um can be approximately half the size of a uniform gap 4 between two layers of the substrate material 2.

An intermediate space 30 between the inner wall 24 of the filter housing 18 and the filter element 1 is approximately half the size of a uniform gap 4 between two layers of the substrate material 2.

Wound-in spacers 6 are provided in the respective gap 4 between the layers of the substrate material 2, as described with reference to the tenth exemplary embodiment in FIG. 13.

LIST OF REFERENCE CHARACTERS

1 Filter element
2 Substrate material
4 Gap between the layers of the substrate material
6 Spacer
8 Central rod
10 Inner end portion of the helically wound substrate material
12 Groove
14 End portion of the spacer to be wound in
16 Filter system
18 Filter housing
20 End portion of the filter housing
22 Axial rib
24 Inner wall of the filter housing
26 Positioning means
28 Projection
30 Intermediate space
Ax Axial direction
Ra Radial direction
Um Peripheral direction

The invention claimed is:

1. Filter element for filtering a substance out of a fluid flow, the filter element comprising:
   multiple mutually-opposite layers of a substrate material on which a sorbing surface is formed on at least one side, at least in part, wherein individual layers of the substrate material are arranged so as to be mutually spaced from each other, and
   at least one spacer provided between two layers of the substrate material in each case,
   wherein the filter element is approximately cylindrically formed and the at least one spacer is oriented in the peripheral direction of the approximately cylindrically-formed filter element.

2. Filter element according to claim 1, wherein the multiple layers are formed of a one-piece substrate material.

3. Filter element according to claim 1, wherein the substrate material is wound approximately helically, such that the filter element is formed approximately cylindrical and has a cross section, in the radial direction thereof, having one of:
   an approximately Archimedean spiral shape,
   an approximately Fermat's spiral shape,
   an approximately logarithmic shape or
   an approximately hyperbolic spiral shape.

4. Filter element according to claim 1, wherein the at least one spacer is formed separately from the substrate material and is arranged on the substrate material.

5. Filter element according to claim 1, wherein the at least one spacer is wound with the substrate material.

6. Filter element according to claim 1, wherein the at least one spacer is formed integrally with the substrate material.

7. Filter element according to claim 6, wherein the at least one spacer is formed as an embossment of the substrate material.

8. Filter element according to claim 7, wherein the embossment is formed as one of:
   a row of approximately punctiforms or
   a row of approximately hemispherical elevations.

9. Filter element according to claim 7,
   wherein the embossment comprises a rod-like elevation, the cross section of which is one of:
      approximately rectangular,
      approximately triangular or
      approximately semi-circular.

10. Filter element according to claim 1, further comprising a central rod in the center of the filter element.

11. Filter element according to claim 10, wherein the substrate material is helically wound and an inner end portion of the helically wound substrate material is connected to the central rod.

12. Filter element according to claim 1, wherein:
   the substance to be filtered is a hydrocarbon,
   the fluid flow is in a fuel container, and
   the sorbing surface is an adsorbing surface.

13. Filter element for filtering a substance out of a fluid flow, the filter element comprising:
   multiple mutually-opposite layers of a substrate material on which a sorbing surface is formed on at least one side, at least in part, wherein individual layers of the substrate material are arranged so as to be mutually spaced from each other, and
   at least one spacer provided between two layers of the substrate material in each case, the at least one spacer being wound with the substrate material,
   wherein an end portion of the at least one spacer that protrudes from the wound filter element in a peripheral direction is arranged on the filter element circumferentially in the peripheral direction.

14. Filter housing having a filter element received therein, the filter element comprising:
   multiple mutually-opposite layers of a substrate material on which a sorbing surface is formed on at least one side, at least in part, wherein individual layers of the substrate material are arranged so as to be mutually spaced from each other, and
   at least one spacer provided between two layers of the substrate material in each case,
   wherein the filter element is approximately cylindrically formed and the at least one spacer is oriented in the peripheral direction of the approximately cylindrically-formed filter element, and
   wherein the filter element is adapted to be received in the filter housing in an axial direction thereof.

15. Filter housing according to claim 14, wherein the filter element is adapted to be positioned in a radial direction by a positioning arrangement that is formed on an inner wall of the filter housing.

16. Filter housing according to claim 15, wherein the positioning arrangement is formed as at least one of:
   an end portion of the at least one spacer that is arranged circumferentially on the filter element in a peripheral direction, and
   projections formed on the inner wall of the filter housing.

17. Filter housing according to claim 14, further comprising axial ribs for a uniform incident flow against the filter element formed on at least one end portion of the filter housing.

18. Filter system comprising:
a filter element for filtering a substance out of a fluid flow, the filter element comprising:
multiple mutually-opposite layers of a substrate material on which a sorbing surface is formed on at least one side, at least in part, wherein individual layers of the substrate material are arranged so as to be mutually spaced from each other, and
at least one spacer provided between two layers of the substrate material in each case;
wherein the filter element is approximately cylindrically formed and the at least one spacer is oriented in the peripheral direction of the approximately cylindrically-formed filter element; and
a filter housing for receiving the filter element, wherein a width of an intermediate space between an inner wall of the filter housing and the filter element which is approximately half the size of a width of a uniform gap between two layers of the substrate material of the filter element;
wherein the filter element is adapted to be received in the filter housing in an axial direction thereof.

19. Filter system according to claim 18, further comprising at least one projection formed on the filter housing.

* * * * *